June 15, 1937.  W. CAMERON  2,083,827
CAN TESTER
Filed Oct. 8, 1932  3 Sheets-Sheet 2
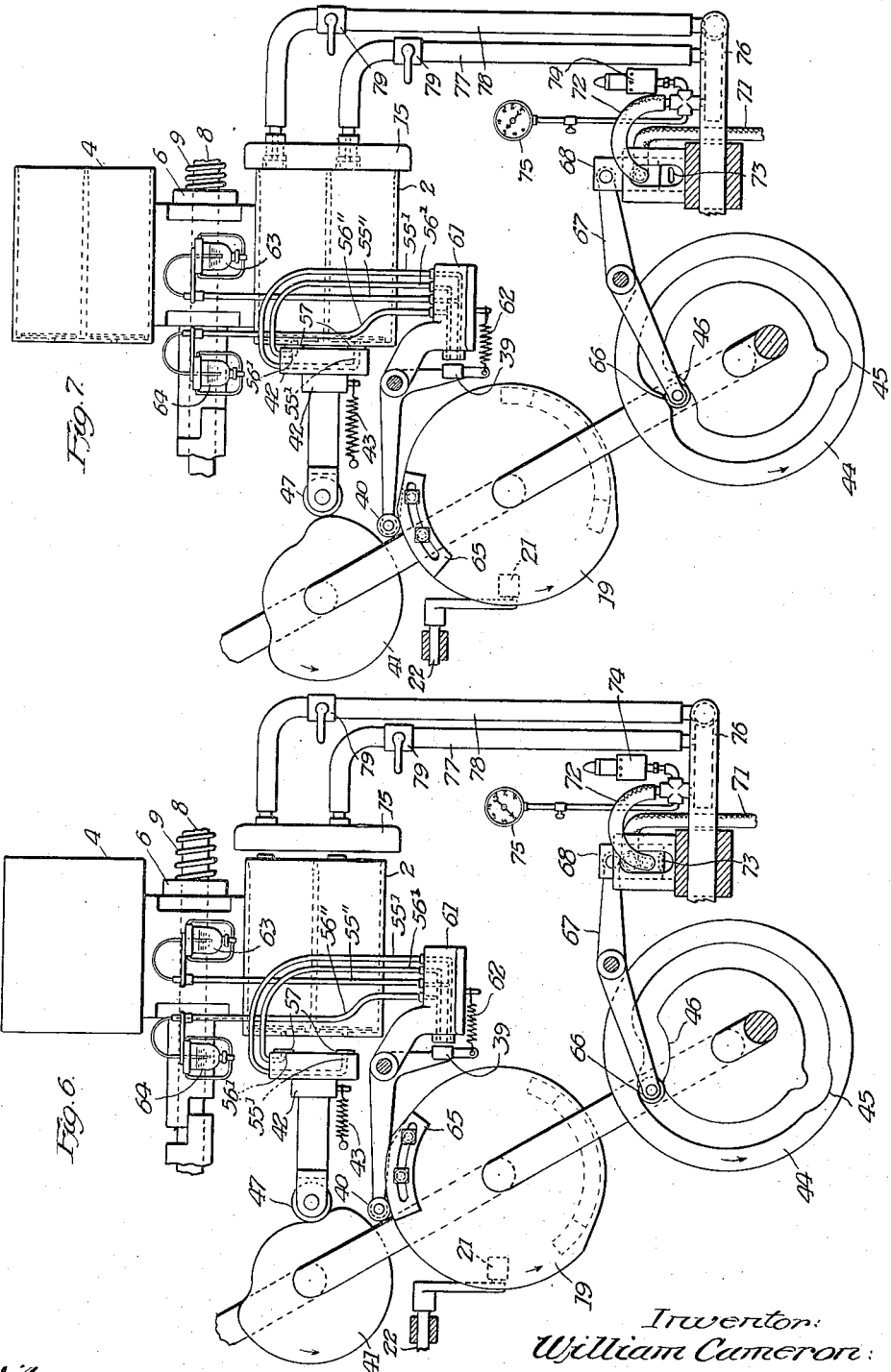

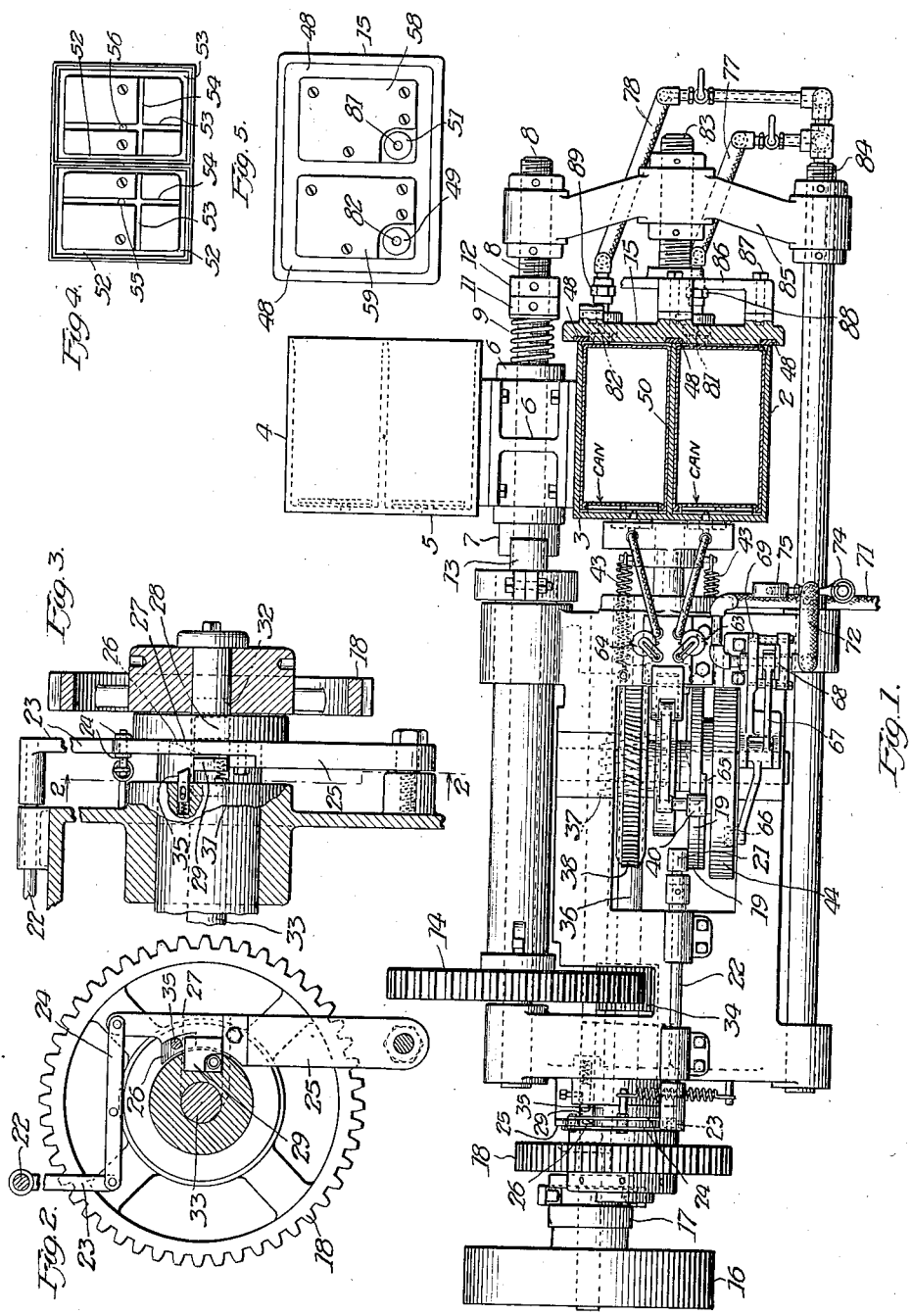

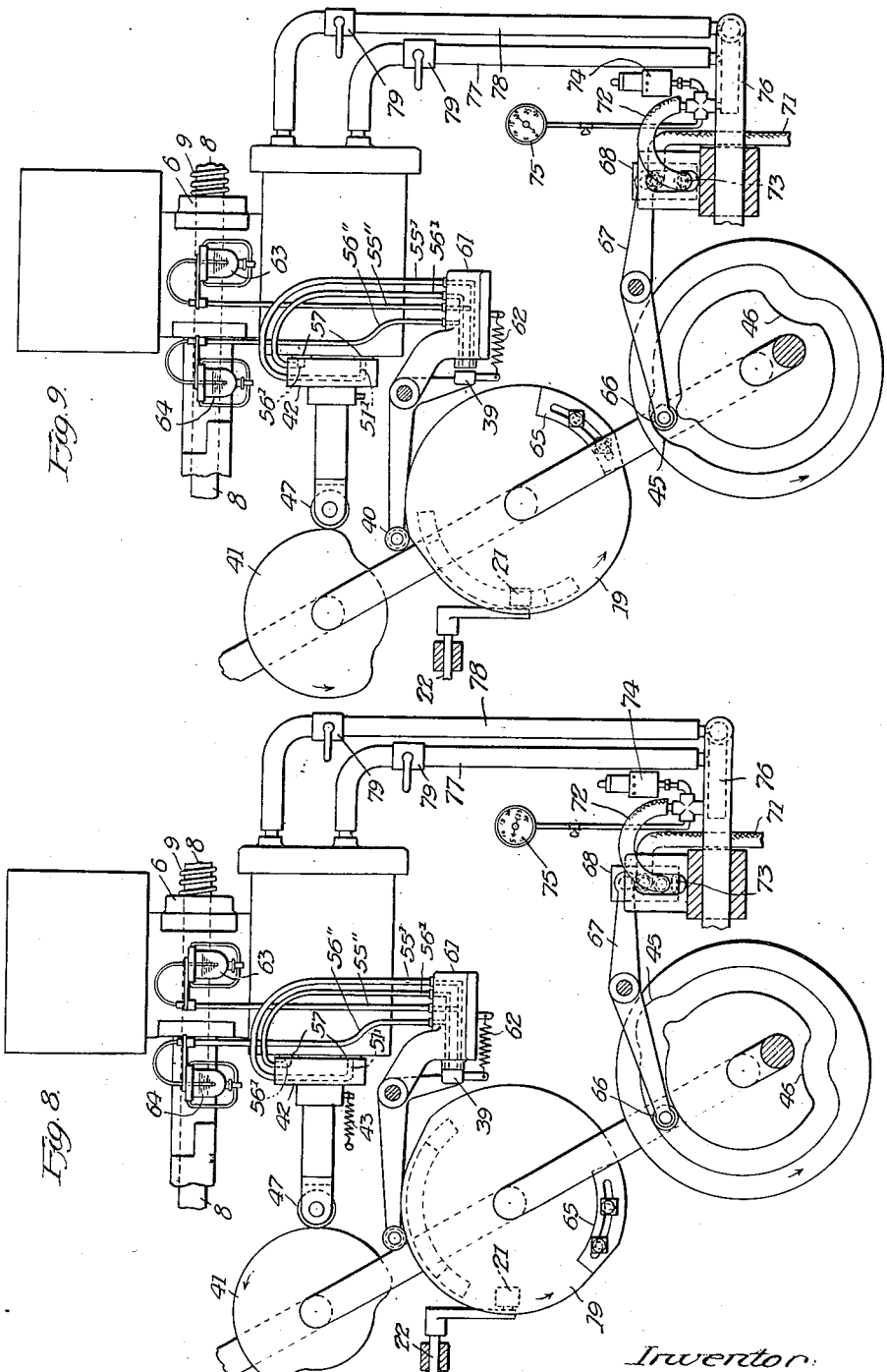

Patented June 15, 1937

2,083,827

UNITED STATES PATENT OFFICE 2,083,827

CAN TESTER

William Cameron, Chicago, Ill., assignor to Cameron Can Machinery Co., Chicago, Ill., a corporation of Illinois Application October 8, 1932, Serial No. 636,835

12 Claims. (Cl. 73—51)

This invention relates to testing cans or containers for leakage prior to use and is particularly designed for the testing of the larger sizes of cans such, for instance, as five gallon oil cans or the like.

Because of the ease with which the walls of these large cans are caused to bulge or become distorted when subjected to pressure, the common practice heretofore has been to subject the cans during the testing operation to a low pressure only, usually about three or four pounds. Such a low pressure, however, is insufficient for the detection of slight leaks. Consequently many cans which have shown no leaks under this low pressure test have subsequently developed leaks in use.

One of the primary purposes of my present invention is to provide a machine by which large sized cans may be tested under high pressure, such for instance as fifteen pounds or more, so that all leaks will be developed and detected during the test, thereby minimizing the leaks occurring in the use of the cans.

In accomplishing this result my invention contemplates exteriorly supporting the walls of the can being tested so that the can will not become bulged or distorted as the result of the high pressure to which it is subjected during the test.

Another purpose of my invention is to provide a machine which will be substantially automatic in operation, to and from which the cans can be rapidly fed and removed, one or more cans being subjected to the testing operation while the tested can or cans are being removed and replaced by others to be tested, thereby enabling high speed testing and large capacity for the machine.

Another object is to provide a machine of such delicacy that notwithstanding the large cubical capacity of the cans to be tested and the high pressure to which they are subjected, the minutest leaks will be rapidly and accurately detected during the rapid operation of the machine.

In the drawings:

Fig. 1 is a top plan view of a tester made in accordance with this invention,

Fig. 2 is a vertical section on the dotted line 2—2 of Fig. 3 showing a clutch mechanism used in this invention.

Fig. 3 is another vertical section through the same clutch mechanism,

Fig. 4 is an end view of a pair of the testing chambers used in this invention,

Fig. 5 is an elevation of a clamping head used to seal a pair of testing chambers during the testing operation, Fig. 6 is a diagrammatic representation showing the relative positions of several of the units in this testing apparatus, showing these units just before the testing chamber is to be sealed to start the testing operation, Fig. 7 is another diagrammatic view of the same equipment showing the several elements in the position they occupy when the cans are being charged with compressed air, Fig. 8 is another diagrammatic view showing the units in position after the charging has terminated and while the cans are undergoing test for leaks, and Fig. 9 is a further diagrammatic view showing the mechanisms in the positions they occupy after test when the cans are being relieved of their pressure.

Referring now to the drawings, Fig. 1 shows the can tester frame, which supports two pairs of testing chambers 2, 3, 4 and 5, these chambers being carried by a bracket 6 on a sleeve 7 which slides on a stationary shaft 8 and is urged normally rearwardly by a compression spring 9 abutting the bracket at one end of its ends and abutting the locking collar 11 at its other end. This collar may be locked on the shaft by means of a second collar 12, the two collars being employed to adjust the compression desired to be maintained in the spring 9.

Sleeve 7 is notched so that it may remain in locking engagement with corresponding recesses or projections on another rotatable sleeve 13, this latter sleeve being keyed to a gear 14. The construction just described enables the sleeves 13 and 7 to be rotated at proper times 180° to bring one or the other testing chamber in alignment with the sealing head 15. The two chambers not in alignment with the sealing head are then off to one side and may be reloaded and made ready to be rotated back again into alignment with the testing equipment. The rotation, however, of these testing chambers is not continuous but is intermittent, there being a pause during which one pair of cans is being tested while another pair of cans previously tested is withdrawn from the other chambers and replaced by new cans.

Any suitable source of power may be employed and as an example it is indicated that a belt may be applied to the pulley 16. A cone type clutch 17 of common design may be employed to permit the pulley 16 to run continuously while the rest of the testing apparatus is disconnected or connected thereto at the will of the operator. A gear, not shown but concentric with the cone is employed to mesh with and drive the gear 18 continuously when the clutch is in its operative position.

In order to provide for the intermittent rotation of the testing chambers there is provided a cam operating clutch, the cam being numbered 19 and having the cam surface on the inner side. The cam follower 21 mounted on an arm offset from the shaft 22 will cause that shaft to rotate whenever the roller rides up on the high points of the cam which in turn will cause a lever 23 acting through a link 24 to swing the bar 25 outwardly whenever it is desired to rotate the testing chambers, and to swing it inwardly whenever it is desired to stop the rotation of the testing chambers. A tapering cam surface 26 integral with the bar 25 will, when the bar is swung inwardly, enter a depression between the two raised portions 27 and 28 of a clutch pin 29. This pin, if allowed to move to the right as viewed in Fig. 3 under the action of the spring 31, would enter a recess 32 in the hub of the constantly rotating gear 18. This clutch pin being slidable in a key way in the shaft 33 will, therefore, cause the latter shaft to rotate and drive a small gear 34 which is constantly in mesh with the large gear 14. Thus motion will be transmitted through the shaft 13 to the two pairs of testing chambers to cause them to rotate. It is following the 180° of rotation of the testing chambers that the cam 19 will cause the bar to swing inwardly. At this time the tapered cam 26 will engage the recess between the projections 27 and 28 as soon as that slidable key comes round to the proper position to be engaged, and this cam surface will cause the key to be withdrawn from the notch 32 whereupon the gear 18 is no longer able to transmit motion to the shaft 33, and the testing chambers will therefore come to rest. A spring pressed plunger 35 shown in Fig. 3 will be pushed back by the clutch pin 29 as the latter slides outwardly and rotates past the end of this plunger and serves to lock the testing chambers in proper alignment.

The shaft 36 having gear 18 keyed thereon is, however, continuously rotating and by means of a worm gear 37 continues to drive a worm wheel 38, the latter being keyed to the shaft which drives the three cams which are best shown in the diagrammatic views.

The cam 19, as stated before, has on its vertical face a cam surface for operating the clutch just above described. On its periphery it has another cam surface for operating a chamber relief valve 39. The cam 41 functions solely for the purpose of forcing the suction head 42 forwardly or permitting it to be withdrawn rearwardly by its spring 43, the latter being connected in any suitable manner to a stationary part of the frame. The cam 44 is provided with a groove on one vertical side thereof which curves radially outwardly at the point 45 and curves radially inwardly at the point 46, the latter portion of the cam being that portion which causes the cans in the testing chambers to be charged. The portion 45 causes the air valve mechanism to move to a relief position permitting the escape of air from the cans after test. Intermediate the points 45 and 46 at both sides are neutral positions which hold the charging valve entirely sealed.

Referring now to Fig. 6 the cams and the associated mechanism operated by them are pictured as the apparatus would stand just after a pair of testing chambers had been rotated over into position ready for a test. At this time the cam follower 47 would be at a low point on the cam 41 but it is clear that a further movement of the latter cam in the direction of the arrow would cause the suction head 42 to move toward the right, that is, forwardly. As soon as the face of this head contacted the back of the testing chambers then in position, the whole testing chamber unit would move forwardly under the action of this cam and against the compression of the spring 9. This would bring the face of the testing chambers against the charging head 15, which is always stationary and would cause the open mouths of the two testing chambers to be sealed by the resilient surface 48 which is so placed on this charging head as to contact the entire margins of the two testing chambers.

While the present embodiment shows two pairs of testing chambers permitting simultaneous testing of two cans while two other chambers are being unloaded and reloaded, it is clear that only one testing chamber could be used on each side of the head or that more than two pairs could be employed if desired. However, as shown in the present embodiment, the ends of the pair of chambers are not only sealed by the resilient pad 48 but also the small openings of the cans are likewise sealed at about the position of the circles 49 and 51 shown in Fig. 5. A central wall 50 separates the two testing chambers. With the chambers and cans both sealed and the testing head 42 pressed tightly against the rear ends of the two testing chambers the machine is then ready to test a pair of cans.

Referring to Figs. 1, 4 and 6 it will be noticed that the bottom of each testing chamber is provided with marginal grooves 52 in which the edges of the can may rest. Between these grooves the inside walls of the testing chambers are raised and extended forward somewhat to snugly contact the bottoms of the two cans. These grooves and elevated portions may be fashioned from the metal of the chambers or may be made of some resilient material. It would be essential in any event to snugly support the bottoms of the cans so that they could not be distorted by internal pressure and to provide ample grooves so that air may leak through defective edges that may be found in the cans. Cross connecting grooves 53 and 54 are also provided which lead to the testing apertures 55 and 56 which register with corresponding passages 55' and 56' in the testing head. The marginal openings of these latter passages are preferably provided with rubber washers 57 to secure a tight seal.

It will also be noted on viewing Fig. 1 that the side walls of the cans rest snugly against the inside walls of the two testing chambers. Fig. 5 shows that similar raised reinforcing plates 58 and 59 are provided to support the top surface of each can during testing. These two plates are recessed at the corners where it is intended to permit the opening of each can to come to rest against the resilient sealing plate at the positions shown by the circles 49 and 51.

Referring again to Fig. 6 it will be noted that prior to the beginning of the charging operation the relief valve 39 is open. This valve serves to provide a short path to atmosphere for the passages 55' and 56', these passages being formed in part by the flexible tubes leading from the testing head 42 to the stationary block 61. Extensions of these two passages are continued to the atmosphere opposite the face of the valve 39 and will be closed simultaneously whenever the cam 19 allows the spring 62 to move the valve forwardly over the mouths of these passage openings. From the stationary head 61 further extensions of these passages 55″ and 56″ terminate in the water glasses 63 and 64 so that if any air escapes from either testing chamber after the test head 42 is in place against the testing chamber and the valve 39 is closed, such air must bubble through the water in the associated glass, and under certain conditions will indicate can leakage. The cam 19 is provided with an adjustable plate 65 which will permit the closing of the valve 39 to be retarded or accelerated with respect to the movement of the cam shaft.

The apparatus for charging the cans and discharging them will now be described. Travelling within the groove in the cam 44 is a roller 66 carried by an arm 67 to which is secured a slide valve 68. Suitable supporting plates are provided on opposite sides of the plate valve, one of them designated 69 having a passage therethrough to which is connected a pipe 71 leading to a source of supply of compressed air. The plate valve 68 itself has a passage extending through from one face to the other and secured to the side of the plate opposite the compressed air pipe opening is a flexible hose 72 which on upward movement of the plate valve may be brought into registration with the pipe 71 so that compressed air may be supplied to the can interiors. As shown, however, in Fig. 6 the plate valve is in such a position that the hose 72 is out of register with the pipe 71 and the valve is then in its neutral position. The supporting plate 69 is provided with an opening 73 to atmosphere which is located below the neutral position of the valve. This opening 73 is best shown in Fig. 8. Connected to the hose 72 is a pressure relief valve 74 of common form provided to make certain that no excessive pressures may be supplied to the can interiors. A pressure gauge 75 is likewise positioned in this hose line for the information of the operator.

The hose line 72 is also connected to the pipe 76 and to the pipes 77 and 78 which, in the charging position of the valve, will conduct air to the interiors of the two cans being tested. Each of these pipes is, however, provided with a common valve 79 so that either testing chamber supply line may be disconnected at will. Fig. 1 shows that the pipes 77 and 78 are connected by passages 81 and 82, respectively through the head 15 to the openings into the cans located in the chambers.

It should be understood that the head 15, in the operation of this machine, is always stationary but the rods 83 and 84 are all threaded so that the head supporting bracket 85 may be adjusted inwardly or outwardly according to the length of the testing chambers which may be mounted on this machine.

The machine operates as follows: Fig. 6 shows the mechanism in the position it occupies immediately after one pair of test chambers has rotated from test position to unloading position and the other pair of chambers has been rotated into test position. At this time the testing head 42 has not yet contacted the back of the testing chambers, relief valve 39 is open and the charging valve 68 is in neutral closed position. Further rotation of the cams toward the position shown in Fig. 7 will cause the testing head 42 to strike the rear end of the testing chambers and push them into sealing contact with the stationary pressure head 15. At the same time the cam 44 will move the charging valve into registration with the compressed air supply pipe and air will immediately be injected into both cans in the testing chambers. For a short time after the entry of the compressed air into the cans the relief valve 39 still remains open, the purpose of this being to permit air to escape from the testing chamber interiors as the cans expand slightly under pressure. It is important to permit this air to escape through the open valve 39 rather than through the water glasses as bubbles passing through the water glasses at such a time would be a false indication of leakage. However, while the charging valve is still in charging position the cam follower 40 will roll off the adjusting plate 65 and close the relief valve 39. Should there be any leakage of compressed air from the can interiors after the closure of the relief valve, bubbles will appear in the water glass connected to the can chamber where the leakage is occurring. The adjusting plate 65 will be so set that the valve 39 will close just before the cans have ceased expanding so that a very, very slight positive pressure will be built up in each passage leading from the test chamber interior to the terminus of the passage in the associated water glass. Then if only a very slight leak occurs in the can chamber small bubbles will immediately appear in the water glass.

Fig. 8 shows the position of all the cams while the cans are being tested. At such time the charging valve has been moved from charging to closed or neutral position and no more air is being supplied to the can interiors. Thus even though the compressed air supply pressure may vary, as it often will, there will be no change in the pressure in the cans nor any change in their volume except where the pressure in any individual can may be affected by its own leakage.

Fig. 9 shows the cam positions at the time the can interiors and testing chambers are being relieved through the charging valve which is then pushed into registration with the relief opening 73, permitting air to escape from both of the cans under test. The relief valve 39 also then becomes open to relieve the testing chambers of pressure and to prevent any forming of a partial vacuum in the testing chambers resulting from the contraction of the cans after relief of pressure therein. It should be understood that though mention is made of the expansion and contraction of the cans in the testing chambers these two changes occur only in a very slight degree due to the fact that the chambers are so shaped and proportioned that they support the can walls against any harmful distortion.

Further rotation of the cams from the positions shown in Fig. 9 will hold the relief valve 39 open, restore the charging valve to neutral position and permit the testing head 42 to be withdrawn rearwardly by the pair of springs 43. The spring 9 will then force the whole testing chamber head rearwardly to break the seal at the sealing head 15 and at this time the clutch shown in Figs. 2 and 3 will operate to permit the clutch pin 29 to engage the gear 18 and effect 180° rotation of the testing receptacles.

It should be understood that many different sizes of cans may be tested on a single machine by attaching to the machine testing chambers specially constructed for each size and shape of the cans to be tested. A bracket 86 may be adjusted rearwardly or forwardly on the threaded shaft 83 and itself may be disconnected from the testing chambers by unscrewing a stud 87 and a corresponding one on the opposite side which is not shown. The compressed air pipes 77 and 78 may be disconnected by means of unions 88 and 89. A new sealing head 15 may be attached to accommodate the chambers and cans to be tested and new chambers may be attached to the bracket 6.

Despite the large volumes of the cans which are tested very small leaks can readily be detected because of the fact that the space surrounding them in the testing chambers is extremely small and even slight air leakages will immediately register in the water glasses. Thus the machine may be operated at a high rate of speed.

It should be understood that the drawings reveal a preferred embodiment selected for the purpose of illustrating the invention but that various modifications of the invention may be devised and employed which will still remain within the spirit and scope of the invention as defined in the claims which follow.

I claim:

1. In a tester for cans having walls capable of flexing under moderate internal pressures, a chamber constructed to snugly surround and support all exterior surfaces of the can, means for sealing said chamber and the can therein, means for supplying compressed air to the can interior, leak detecting means connected to the chamber interior responsive to pressure changes therein, means arranged for opening the chamber interior to atmosphere prior to relieving the internal pressure in the can and means arranged for relieving the can internal pressure after opening the chamber.

2. In a tester for cans having walls capable of flexing under moderate internal pressures, a chamber and a sealing member therefor constructed for cooperatively supporting the can snugly on all of its exterior surfaces and for providing a sealed testing chamber, means arranged for charging the can with compressed air after it has been sealed by said member within said chamber, means arranged for relieving pressure from said sealed chamber resulting from expansion of the can during charging, and means connected with the chamber interior for detecting air leakage thereinto from the can after completion of the charging thereof.

3. In a tester for cans having walls capable of flexing under moderate internal pressures, a movable carrier provided with a plurality of testing chambers, means for sealing said chambers when they are moved to a testing position, the last said means and the chambers being constructed for snugly supporting the cans on all of their exterior surfaces, means operable after any of said chambers has been sealed at said testing position for injecting compressed air into the can therein, means arranged for relieving pressure from said chamber resulting from expansion of the can during charging, and leak detecting means communicating with said chamber interior at said testing position responsive to pressure changes in said chamber.

4. In a tester for cans having walls capable of flexing under moderate internal pressures, a carrier having at least one testing chamber thereon, means for automatically moving said chamber to a testing position and holding it stationary thereat for a predetermined time interval and further constructed to move said chamber to a loading position and for maintaining it thereat during a predetermined time interval, means synchronized with the chamber moving means for sealing said chamber at the testing position, the last said means and the chamber being constructed to snugly support the can on all of its exterior surfaces during the test, means synchronized with the chamber moving means and sealing means for injecting compressed air into the can when so sealed, and leak detecting means likewise so synchronized responsive to internal pressure in the chamber outside of the can for detecting can leakage.

5. In a tester for cans having walls capable of flexing under moderate internal pressures, means including a chamber and a sealing member therefor for enclosing such a can in said chamber and supporting all of its surfaces snugly, means synchronized and constructed for charging the can with compressed air after it is sealed in said chamber, means for permitting the escape of air from the otherwise sealed chamber interior during the charging of the can and for cutting off said escape just before charging is completed, and arranged for thereafter detecting air leakage from the can into the chamber surrounding the can.

6. In a tester for cans having walls capable of flexing under moderate internal pressures, an open-ended chamber and sealing means for said end constructed to cooperate in snugly supporting such a can on all of its side and end surfaces when sealed in said chamber, the chamber walls having recesses for conducting air leakage and a test port in one wall thereof, means for injecting compressed air into said can, and leak detecting means including a flexible tube one end of which is reciprocable for registration with said port to establish communication with the chamber interior and arranged to be operated by pressure changes in the chamber interior surrounding said can.

7. In a tester for cans, a testing chamber and means mounting the same arranged for moving the chamber intermittently from loading position to testing position and back, means including continuously driven cams for performing a testing operation on a can in the chamber at said testing position, means for driving said cams continuously, and means operatively connectable with the last said means constructed for intermittently moving said chamber.

8. In a tester for cans having walls capable of flexing under moderate internal pressures, a chamber and a sealing member therefor constructed for supporting a can snugly on all of its exterior surfaces, the chamber having a test port and channels communicating therewith for conducting air leakage, means for charging the can with compressed air, and means connected with said port for detecting air leakage thereinto from the can after completion of the charging thereof.

9. In a tester for cans having walls capable of flexing under moderate internal pressures, a chamber having one open end, a movable closure member for said end, said member and walls of the chamber cooperating to support a can snugly on all its exterior surfaces, means for charging the can with compressed air after the closing of the chamber, leak detecting means connectable to the chamber interior and responsive to pressure changes in said interior, and means regulated for relieving air pressure in said chamber resulting from expansion of the can during charging, after said open end has been closed by said closure member.

10. In a tester for cans having walls capable of flexing under moderate internal pressures, a chamber having one open end, a movable closure member for said end, said member and walls of the chamber cooperating to support a can snugly on all its exterior surfaces, means for charging the can with compressed air after the closing of the chamber, leak detecting means connectable to the chamber interior and responsive to pressure changes in said interior, and means for rendering said leak detecting means inoperative after said chamber has been closed by said closure member during a portion of the period for charging the can and for rendering the same operative thereafter.

11. In a tester for cans having walls capable of flexing under moderate internal pressures, a chamber having one open end, a closure member therefor, said chamber walls and said closure member being constructed for supporting the can snugly on all of its exterior surfaces, leak detecting means connectable with said chamber including a conduit and a body of liquid arranged for disclosing bubbles of air delivered by the conduit, and means constructed and regulated for relieving air pressure in the chamber interior after closure by said member during a portion of the period for charging of the can and timed to terminate such relief sufficiently before completion of said charging to enable a slight positive pressure to be built up in said conduit.

12. In a tester for cans having walls capable of flexing under moderate internal pressures, a chamber having one open end and a closure member therefor, said chamber walls and said member being constructed for snugly supporting the can on all its exterior surfaces, means operative to charge a can with compressed air only after the chamber is closed and the can snugly supported, a leak detecting mechanism connectable with the chamber interior, means for relieving pressure from the chamber interior resulting from expansion of the can during charging, means for rendering said pressure relieving means inoperative approximately at the conclusion of the charging of the can, and means for rendering said mechanism operative thereafter.

WILLIAM CAMERON.